H. KRÜGER.
METHOD OF MAKING TABLE IMPLEMENTS.
APPLICATION FILED MAR. 4, 1911.
1,053,406.
MODEL.
Patented Feb. 18, 1913.
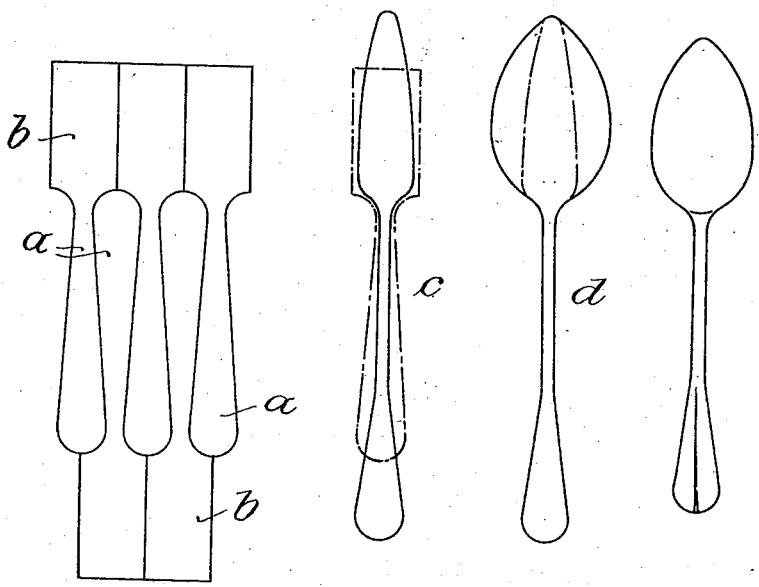

UNITED STATES PATENT OFFICE.

HERMANN KRÜGER, OF BERNDORF, AUSTRIA-HUNGARY.

METHOD OF MAKING TABLE IMPLEMENTS.

1,053,406.  Specification of Letters Patent.  Patented Feb. 18, 1913.

Application filed March 4, 1911. Serial No. 612,402. (Model.)

*To all whom it may concern:*

Be it known that I, HERMANN KRÜGER, merchant, subject of the Emperor of Germany, residing at Berndorf, Austria-Hungary, have invented new and useful Improvements in Methods of Making Table Implements, of which the following is a specification.

My invention relates to methods of manufacturing spoons, forks and like table-implements without loss of material.

In order to avoid all loss of material and simultaneously to simplify, and to reduce the cost of the manufacture when making spoons, forks and the like, according to my invention the blanks, from which the finished articles are made, are cut out of a sheet of suitable metal without any loss, and, in addition, in such manner that the blanks themselves which were heretofore cut in order to shape them according to the finished article, can be stretched and changed in shape by rolling them edgewise or pressing them so that the final shape of the article is obtained not only by simple stamping and without any loss of material, but all other intermediate treatment of the blank, such as rolling it flat, heating it to incandescence, or the like, can be avoided.

Figure 1 represents a plurality of blanks. Fig. 2 represents the shape of one of the blanks after the first operation. Fig. 3 represents the shape of a blank after the second operation. Fig. 4 represents the finished article.

Referring firstly to Fig. 1, the shape of the blanks is such that the material left between the handles $a$ of two adjacent blanks forms the handle of a third blank which is arranged displaced 180° relatively to the two former blanks, which arrangement is well known in itself. The blanks are consequently alternately cut out in reverse positions, so that no loss of metal is caused; according to my invention each blank is shorter than the length of the finished spoon, but is nevertheless composed of exactly as much metal as is subsequently required for the finished stamped spoon without any burs being formed, or in other words the quantity of metal in the blanks according to Fig. 1 is exactly equal to that in the finished spoons. In order to make the blade $b$ of the blank of a shape and length favorable for rapidly obtaining the finished article, I pass it edgewise between two superposed rolls, not shown, of such section that the shape of the blade $b$ is changed from that shown in Fig. 2 in dotted lines into that shown in full lines. Simultaneously or, if preferred, in a special operation, the handle $a$ of the blank is also rolled or pressed edgewise into such a shape and such a length that it is suitable for being subsequently stamped, so that the half-finished blank or work-piece $c$ represented in full lines in Fig. 2 is obtained. Owing to the metal of the original blanks being pressed edgewise it is so distributed that when the work-piece $c$ is subsequently stamped or pressed the final outline of the finished article $d$, shown in Fig. 3, is obtained at once without any waste of material, whereupon the bowl of the spoon, ornamentations on the spoon, and the like, can be made in known manner (Fig. 4).

The herein described method is equally suitable for all metals which are ordinarily used in the manufacture of spoons, forks and other table-implements, and can be successfully used for making not only spoons but also forks and other table-implements.

I claim:—

1. The herein described method of manufacturing table implements from metal blanks of the shape described, which consists in providing a blank which is shorter than the length of the finished article, but which contains as much metal as the finished article is to contain, then submitting the blank to an edgewise pressure progressing along the blank in a single operation and thereby extending the same to the length of the finished implements to be made and simultaneously so transforming the rectangular blade of the blank that the blanks thus obtained can be brought into their final shape by plain pressure without a change in the amount of the material and in stamping or pressing the preliminarily treated blanks thus obtained into the required final form of the implements.

2. The herein described method of manufacturing table implements from metal blanks of the shape described which consists in providing a blank which is shorter than the length of the finished article but which contains as much metal as the finished article is to contain, then submitting the blank to an edgewise pressure in succession, first from the one and then from the other end of the blank, and thereby extending the same to the length of the finished implements to be made and simultaneously so transforming the rectangular blade of the blank that the blanks thus obtained can be brought into their final shape by plain pressure without a change in the amount of the material and in stamping or pressing the preliminarily treated blanks thus obtained into the required final form of the implements.

In testimony whereof I have signed my name to this specification in the presence of two subscribing witnesses.

HERMANN KRÜGER.

Witnesses:
 ADA MARIA BERGER,
 AUGUST FUGGER.

Copies of this patent may be obtained for five cents each, by addressing the "Commissioner of Patents, Washington, D. C."